United States Patent [19]

Horowitz

[11] Patent Number: 4,464,705
[45] Date of Patent: Aug. 7, 1984

[54] DUAL LIGHT SOURCE AND FIBER OPTIC BUNDLE ILLUMINATOR

[76] Inventor: Ross M. Horowitz, 440 E. 79th St., New York, N.Y. 10021

[21] Appl. No.: 261,519

[22] Filed: May 7, 1981

[51] Int. Cl.³ .................... F21V 7/04; G03B 15/02
[52] U.S. Cl. ................................ 362/12; 362/32; 362/16; 362/216; 362/228; 362/355; 362/246; 362/223
[58] Field of Search ............. 362/32, 216, 12, 16, 362/239, 246, 335, 228, 804, 234, 247, 223, 232, 355; 350/96.15, 96.2; 128/6, 7, 8, 9

[56] References Cited

U.S. PATENT DOCUMENTS

| | | | |
|---|---|---|---|
| 2,542,311 | 2/1951 | Carlson | 362/12 |
| 2,959,097 | 11/1960 | Mollring | |
| 3,278,739 | 10/1966 | Royka et al. | |
| 3,382,353 | 5/1968 | Wappler | |
| 3,449,036 | 6/1969 | Jacobsen | 362/32 X |
| 3,600,568 | 8/1971 | Weyrauch | |
| 3,638,008 | 1/1972 | Keller et al. | 362/32 |
| 3,669,524 | 6/1972 | Shio | |
| 3,681,592 | 8/1972 | Hugelshofer | 362/32 |
| 3,683,167 | 8/1972 | Rishton | 362/32 |
| 3,716,298 | 2/1973 | Reardon | 362/216 X |
| 3,770,338 | 11/1973 | Helmuth | 362/32 X |
| 3,775,606 | 11/1973 | Bazell et al. | |
| 4,048,486 | 9/1977 | Kriege | |
| 4,053,756 | 10/1977 | Takahashi | 128/6 |
| 4,106,078 | 8/1978 | Inoue | |
| 4,112,335 | 9/1978 | Gonser | 362/32 |
| 4,234,910 | 11/1980 | Price | 362/32 X |
| 4,257,672 | 3/1981 | Balliet | 350/96.2 X |
| 4,281,366 | 7/1981 | Wurster et al. | 362/32 |
| 4,329,737 | 5/1982 | Triller et al. | 362/32 |

Primary Examiner—Richard E. Schafer
Assistant Examiner—John S. Maples

[57] ABSTRACT

An apparatus for illuminating small animate or inanimate objects which employs at least one fiber optic bundle disposed on a selected area of a diffusion dome illuminated by a dual light source comprising, for example, an annular shaped light source having disposed along its central axis a linear-shaped source or a point light source relative to the size of the annular light source. The invention also relates to a method for accurately illuminating small animate or inanimate objects for observation or to be photographed.

24 Claims, 5 Drawing Figures

DUAL LIGHT SOURCE AND FIBER OPTIC BUNDLE ILLUMINATOR

FIELD OF THE INVENTION

The invention relates to an apparatus employing at least one fiber optic bundle disposed on a selected area of a diffusion dome illuminated by a dual light source means comprising, for example, a continuous modeling light source and an intermittent flash light source. The invention also relates to a method for controllably illuminating small objects which can then be photographed.

BACKGROUND OF THE INVENTION

There are many instances where the use of electronic flash as the light source in photography is advantageous. However, in all but the most routine and repetitive situations, for example, automated coin-box photography, it is important for the photographer to be able to anticipate the effect of the flash on the subject or object prior to taking the photograph. There are several different approaches to correct the weaknesses or limitations characteristic with the use of electronic flash as the sole light source.

One solution involves the use of instant materials, for example, Polaroid films, to check the lighting. This is advantageous since this check includes the camera and optics as well as the lighting. In situations requiring many light sources, such checks are both costly and time consuming and may result in a lost photograph if the object moves in an uncontrollable manner and the action cannot be duplicated.

Another solution attacks the problem more directly. It involves the placement of a continuous light source, for example, a tungsten-halogen bulb, symmetrically within a helical or annular flash tube and mounting the combination symmetrically within the same reflector. A further refinement is the use of a diffusing envelope to enclose both the flash and continuous source to provide even more accurate modeling. Furthermore, power supplies for such lamp heads often have provision for varying the intensity of the flash and for varying the intensity of the modeling light, in proportion to and independently of the flash output. In addition, several such lamp heads may be connected to the same power supply since compared to early generators, modern power supplies offer large power output in a relatively small, light weight and inexpensive package.

The importance of these developments to the production of high quality photographs in a reasonable time is attested to by their acceptance by the photographic community. However these developments are primarily designed and used for photographing relatively large objects. In the range of image size to object size of 1:10 to 1:1 such units are used, however there is still a need for more controlled lighting in small areas.

At magnifications greater than the ratio of image size to object size of about 40:1, that is in the microscopic region, various light sources and reflectors are known to provide light for visual and photographic purposes. Unlike the broad sources often used in large object photography, a principal requirement here is to produce an extremely intense beam in a small area. Most of these employ a continuous light source of small size in combination with various condensing lenses. To overcome excessive heat at the object surface, illuminators using fiber optics to bring light to the object, with the source removed from the immediate area, have been successfully employed. Some of these illuminators use both an electronic flash and a continuous source, both totally directed onto a single fiber optic bundle of small diameter (typically 1/16" to ⅛" in diameter). Such units are very specialized lights, using small diameter fiber bundles having one bundle per light source and, in general, they are designed for microscopic use.

Although photographic hardware includes macro lenses for single lens reflex cameras, apochromatic lenses for use at and near 1:1 magnification, and special lenses for use in the range of magnifications from 1:1 to 40:1 including special photographic stands for using these lenses with small and large format films, lighting for this type of photography has been exceedingly limited, requiring great skill, ingenuity and time to produce acceptable photographs. Consequently, light sources employed in other areas of photography are called into use and illuminators designed for visual inspection are even sometimes called upon to expose film.

The disadvantages of using nonflash or continuous light for photographing objects within the image to object range of greater than 1:1 are that it produces a high heat output in a confined area, involves a relatively high cost for multiple lights, and entails difficulty in maneuvering multiple lights in a confined area. In addition, long exposure times which are generally required often necessitate costly anti-vibration equipment and result in a restricted ability to photograph mobile living material.

The use of fiber optics with a continuous source solves the heat and maneuverability problems but the other problems remain. Several commercial fiber optic illuminators are capable of using a plurality of bundles from a single continuous source, usually a tungsten-halogen bulb. These units generally control intensity of the light by varying the voltage. This is acceptable for visual inspection and black and white films, however, changing the voltage changes the color temperature of the source so that such units are extremely cumbersome for use with color films. Similarly, those sources employing fluorescent tubes and discontinuous arc sources are very difficult to use with color films where critical color is important.

One of the principal difficulties with photography in the image to object magnification range of 1:1 to 40:1 is that many of the objects can be considered 3-dimentional as opposed to the 2-dimensional nature of microscope slides and thin sections. The 3-dimensional aspect coupled with very little depth of field means that accurate lighting is often necessary to help delineate the object. Accurate lighting in this case means the ability to control the placement of highlights and shadows and their intensities within a small area. Furthermore, if the object is of a complicated shape, many lights may be necessary to achieve optimal photographic results. Consequently, these considerations lead many photographers to use a continuous light source, despite its disadvantages, in preference to flash sources which do not provide for accurate modeling.

Those illumination sources using an electronic flash which have been designed for close-up photography and which are used at 1:1 and up to about 3:1 may be divided into three basic types, as well as a bare bulb flash placed close to the object. The first type is called a ring light and consists of a circular flash tube positioned so that the lens is in the center of the tube and the optical axis is perpendicular to the plane of the flash tube. Ring lights are designed to illuminate cavities and to provide a shadowless light, i.e., they provide one important photographic control at the lower magnifications for certain shaped objects. These units come in various sizes and some have one or two small continuous light sources attached which are primarily used as focusing aids and not as modeling lights. One variation of this type of light source consist of four flash tubes arranged around the perimeter of a square rather than a circular enclosure such that each side of the square has a small continuous light which could give some approximation of the flash effect. A recent advance in this type of light source for use with a 35 mm camera has been to incorporate an auto flash system along with the ring light, again without a modeling light.

A second type involves the use of one or two small portable electronic flash units mounted in a more or less fixed orientation with respect to the lens. Some such set-ups use automatic flash units where a sensor restricts the duration of the flash as the flash to object distances decreases. This is less than desirable for critical color work because of reciprocity effects due to very short flash durations. Such set-ups offer convenience at the expense of control, and again, there is no modeling source involved.

The third type of light which is available is the focusing spot light which uses both electronic flash and a continuous source for viewing. These units are rather large and somewhat difficult to manipulate in small increments. It is an excellent light in the lower magnification but does not in itself solve the problems throughout the range of magnifications required.

A recent commercial fiber optic device consists of a fiber optic ring light connected to a continuous light source. With this arrangement a person can properly view the effect of the ring light, however, a flash source is not employed.

A practical difficulty with providing an entirely new source of illumination involves its expense. Ideally, a new illuminator would employ as much existing technology as possible so that the photographic studio or laboratory could add the new source to existing equipment in an modular way. Alternatively, the new illuminator would be such that it could easily be adapted for use in other applications, for example, close-up photography and photomicrography.

An object of the present invention is to provide a dual light source apparatus for illuminating a diffusion dome and wherein at least one fiber optic bundle is disposed within a specific area on the diffusion dome so that the light illuminated through the diffusion dome to the fiber optic bundle can be used as a modeling light source for illuminating small objects which can then be photographed and/or observed.

Another object of the present invention is to provide a dual light source apparatus for illuminating a diffusion dome which can accommodate a plurality of the same size or different size fiber optic bundles within a specific area on the diffusion dome so that the light illuminated through the diffusion dome to the fiber optic bundles can be used to illuminate one or more objects.

Another object of the present invention is to provide a dual light source apparatus for illuminating a diffusion dome which, in turn, is coupled to at least one fiber optic bundle disposed within a specific area of the diffusion dome so that the light from the dual light source transmitted through the fiber optic bundle can be used to illuminate an object for observation and/or photography.

Another object of the present invention is to provide a dual light source and fiber optic bundle illuminator which provides a fairly uniform intensity distribution in the light emanating from the fiber optic bundle without a central intense hot spot and without halos of great intensity even though the sources of light are from a modeling light source and a flash light source.

Another object of the present invention is to provide an illuminator employing a dual light source coupled to fiber optic bundles which can provide a photographer with the variety and control of lighting normally available for large object photography for use in the area of small object photography.

Another object of the present invention is to provide an illuminator for photographic and visual work in the range of magnifications from about 1:1 to about 40:1 which employs both an electronic flash and an accurate modeling light so that the chief benefits of the flash illumination can be enjoyed without the disadvantage of an inaccurate modeling light or no modeling light at all.

It is another object of this invention to couple a dual light source with finer optics and thereby enjoy the benefits of using fiber optic bundles(s) to carry the light to the subject/object.

It is another object of this invention to demonstrate a manner and method of interfacing a dual light source with fiber optic bundle(s) so that the light emitted by the fiber optic bundles(s) may be used for the purposes referred to above.

The foregoing and additional objects will become more fully apparent from the following description.

SUMMARY OF THE INVENTION

The invention relates to a dual light source apparatus for illuminating small animate or inanimate objects which could be photographed comprising a first light source spaced apart from a second light source with both light sources disposed to illuminate a diffusion dome (i.e. surface); at least one fiber optic bundle having a distal end and a proximal end, said at least one fiber optic bundle having an acceptance cone such that light emitted within the conical frustrum segment of the acceptance cone extending from the proximal end of the bundle will be effectively conducted through the at least one fiber optic bundle out through the distal end by substantially total reflection; and wherein the proximal end of the at least one fiber optic bundle is disposed at the diffusion dome and within a specific area of the diffusion dome such that the first light source and the second light source are totally encompassed within the conical frustrum segment of the acceptance cone at the proximal end of the fiber optic bundle and wherein the first light source and the second light source are both not encompassed within a conical frustrum segment of a central cone, at the proximal end of the at least one fiber optic bundle, having an apex angle of between about 15% and about 35% of the apex angle of the acceptance cone and preferably between about 20% and about 30% of the acceptance cone angle.

The invention also relates to a method for illuminating small animate or inanimate objects with control over highlights and contrast comprising the steps:

(a) positioning a diffusion dome over a dual light source comprising a first light source spaced apart from a second light source;

(b) placing the proximal end of at least one fiber optic bundle on and within a selected area of the diffusion dome such that the first light source and the second light source are encompassed within the conical frustrum segment of the acceptance cone at the proximal end of the at least one fiber optic bundle and such that the first light source and the second light source are both not encompassed within a conical frustrum segment of a central cone, at the proximal end of the at least one fiber optic bundle, having an apex angle of between 15% and about 35%, preferably about 20% to about 30% of the acceptance cone angle.

As used herein, the acceptance cone is the volume defined by a right angle cone having its apex on the central longitudinal axis within the fiber optic bundle and its side tangent to the peripheral edge at the proximal end of said bundle such that light rays entering the proximal end from within the conical frustrum segment of the cone extending from the proximal end of the bundle can be effectively conducted through the fiber optic bundle out through the distal end by total reflection. Light rays entering the proximal end from outside this conical frustrum segment of the acceptance cone will break through the side wall of the bundle and get lost. The apex angle of the acceptance cone is also referred to as the acceptance angle. In the literature, reference is made to the numerical aperture which equals the sine of one half of the acceptance angle. This numerical aperture can also be expressed as $$\frac{\sqrt{n_1^2 - n_2^2}}{n_0}$$

wherein $n_0$ = Refractive index of outside medium (air $n_0$ = 1)
$n_1$ = Refractive index of inner glass (core)
$n_2$ = Refractive index of outer glass (clad).

As used herein, a central cone is the volume defined by a right angle cone having its apex on the central longitudinal axis within the fiber optic bundle and its side tangent to the peripheral edge at the proximal end of said bundle. The conical frustrum segment of the central cone extending from the proximal end of the fiber bundle is concentrically positioned within the conical frustrum segment of the acceptance cone. The apex angle of the central cone is called the central angle.

As used herein, the first and second light sources could each comprise at least one light source and therefore the dual source of the invention is more properly a dual location for sources. For example, one of the light sources could be an intermittent light source in the form of an annulus or could comprise two or more arc-shaped segments juxtaposed to form a substantially annular configuration. Examples of intermittent or flash light sources suitable for use in this invention are xenon flash tubes, krypton flash tubes and various gas mixtures thereof. The other light source could be a continuous or modeling light source such as a tungsten-halogen quartz bulb, a high pulse rate xenon tube, etc.

One light source may be located within the center of a circle formed by the other light source and may lie above, below, or in the plane of the first referred to light source.

The center light source may have a linear shape, i.e. long compared to its diameter, or a point shape, i.e. the length is comparable to the diameter and both dimensions are small relative to the diameter of the annulus of the other light source.

The center light source may be a continuous source, e.g. a tungsten-halogen quartz bulb, or it may be a pulsed xenon tube, and if it is to serve as a modeling light then the pulse rate would have to be high enough to give the visual appearance of a "continuous" source. Note that the pulse rate could be controlled by the user.

Similarly, the outer disposed light source could have a variable or fixed pulse rate in which case it could be used for a modeling light if the pulse rate were high enough and also a photographic source either for stroboscopic effects, or by having a lower pulse rate for static subjects.

If the outer disposed source had a variable pulse rate, the inner source could either augment the outer source, or the inner source could be used as a "continuous" modeling light to keep track of the subject while the pulse rate of the outer source is varied to the desired rate.

The diffusion dome preferably should be frosted on the side facing the light sources and smooth on the side facing the fiber optic bundle so as to provide an evenness of illumination for the proximal end of the bundle. The frosting should have a gran size which is small compared to the smallest diameter fiber optic bundle to be used. The fiber optic bundle could be a single bundle, a bifurcated bundle, a trifurcated bundle, and so forth, and vary in diameter for example, between 1/16 inch and ⅛ inch. Commercially available fiber optic bundles suitable for this invention generally have an acceptable cone having an apex angle between about 82° and about 67°. Preferably, the fiber optic bundles should have an acceptance cone with a large apex angle, preferably about 82° because a large acceptance angle permits the use of commonly available equipment and permits the use of large diameter fiber bundles. The central cone within the acceptance cone should have an apex angle no greater than 35% of the acceptance angle, and preferably about 25%. Although not wanted to be bound by theory, it is believed that an apex angle less than 15% and greater than 35° of the acceptance angle would result in limiting the choice of the central source and in general would reduce the good agreement between the light emitted by both sources.

DETAILED DESCRIPTION OF THE DRAWINGS AND THE PREFERRED EMBODIMENT

Figure 1:
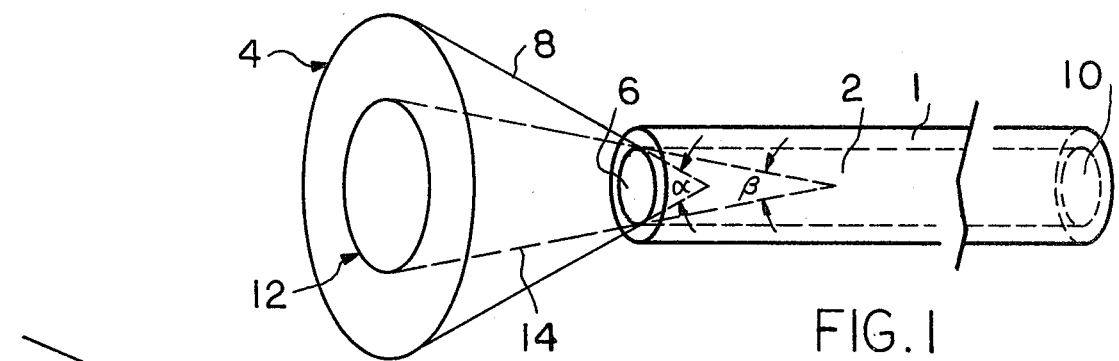
FIG. 1 is an isometric view of a fiber optic bundle illustrating the acceptance cone and the central cone as used in this invention.

Referring to FIG. 1, a fiber optic bundle 2 with cladding 1, is shown having an acceptance cone 4 with an apex (acceptance) angle ⅔ (alpha) on the central longitudinal axis of the bundle 2 and extending from the proximal or receiving end 6 of the bundle 2. As stated above, the sign of half of alpha is referred to as the numerical aperture. Any light rays emanating from within the conical frustrum segment 8 of the acceptance cone 4 which extends from the proximal end 6 of the bundle 2 will be conducted through the bundle out through the distal or exiting end 10 by total reflection. Light rays outside this conical frustrum segment 8 will break through the side wall of the bundle 2 and get lost. A central cone 12 is shown having an apex angle β (beta) also on the central longitudinal axis of bundle 2 and extending from the proximal end 6 of bundle 2. At the proximal end 6 of bundle 2, the sides of conical frustrum segments 8 and 14 of cones 4 and 12 respectively, coincide and are tangent to the peripheral edge defining the proximal end 6 of bundle 2. In the subject invention, in order to transmit the proper lighting through the fiber optic bundle 2 for accurately illuminating small animate or inanimate objects, the two light sources must be totally contained within the conical frustrum segment 8 of acceptance cone 4 while simultaneously the two light sources must not be contained within the conical frustrum segment 14 of the central cone 12. Preferably the apex angle β (beta) should be between about 20% and about 30% of the apex angle alpha which should be between about 67° and 82° and preferbly 82°.

Figure 2:
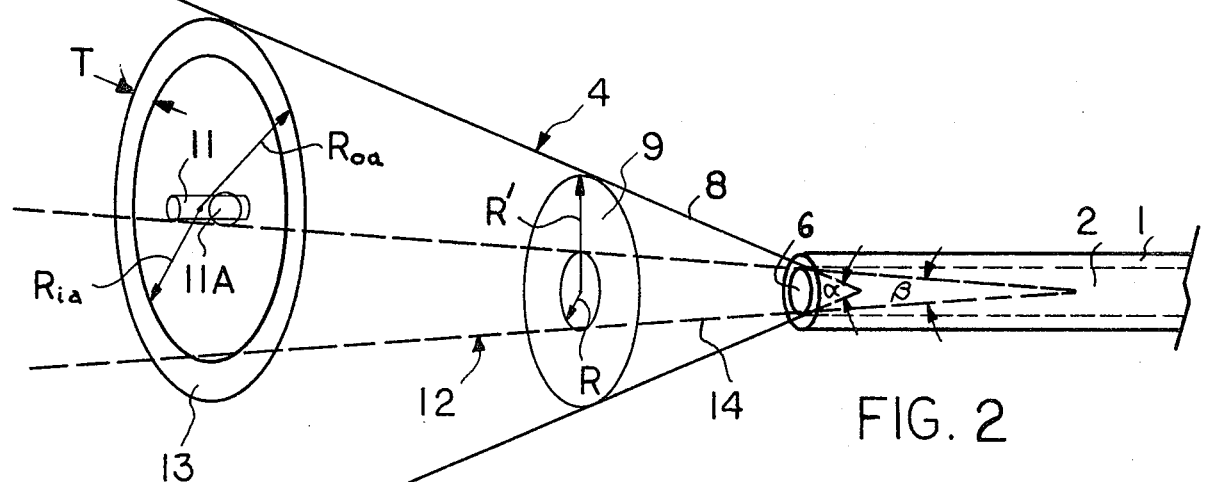
FIG. 2 is an isometirc view of the fiber optic bundle of FIG. 1 showing the position of the first and second light sources.

As shown in FIG. 2, the fiber optic bundle 2 is again illustrated with the same reference numbers as in FIG. 1 and additionally shows the position of a linear light source 11 or spherical light source 11A disposed within an annular light source 13. As illustrated in FIG. 2, both light sources 11 or 11A and 13 are totally contained within acceptance cone 4 and both light sources are not contained within central cone 12. In this arrangement the fiber optic bundle 2 will transmit the proper lighting for accurately illuminating small animate or inanimate objects which can then be photographed.

Once the fiber optic bundle, the specific type of light sources to be employed and the diffusion dome are selected, then the relative positioning of these components is rather restrictive if both light sources are to fall totally within the acceptance cone and no part of either of the light sources is to fall within the central cone.

To illustrate this requirement in FIG. 2, a basal plane 9 is shown along with a dual light source 11(11A) and 13 which are disposed in a plane normal to the axis of fiber optic bundle 2 and wherein:

R = radius of central cone 12
R' = radius of acceptance cone 4
Ria = inside radius of annulus 13
Roa = outside radius of annulus 13
T = thickness of the annulus 13.

The first condition for both sources not to be within central cone 12 is:

Ria > 2R.

If Ria = 2R, then the central source 11(11A) would touch central cone 12 where central cone 12 intersects the plane containing annulus 13 and depending on the size of central source 11 (11A), it will be outside central cone 12 is disposed on the side of annulus 13 facing fiber optic bundle 2 and will be inside central cone 12 if disposed on the side of annulus 13 facing away from fiber optic bundle 2. If Ria = 2R, and if the central source 11(11A) lies between annulus 13 and fiber optic bundle 2, then in any case it must satisfy the second condition in which Roa < R' − R if both sources are to be within acceptance cone 4. From the first condition 2R < Ria and since Ria = Roa − T, then 2R < Roa − T and 2R + T < Roa. From the second condition, Roa < R' − R. Combining the last two inequalities yields 2R + T < Roa < R' − R and 2R + T < R' − R. Thus since T has to be greater than zero, then $$3R < R' - T < R' \text{ or } R < \frac{R' - T}{3} < \frac{R'}{3}$$

Therefore to meet the conditions as set forth above, $R < \frac{1}{3}R'$.

It should be noted that locating the sources in a common plane in accordance with $R/r' < \frac{1}{3}$ so that the first two conditions are simultaneously fulfilled is a necessary but not sufficient condition for fulfilling the interfacing requirements of this invention. The sufficient conditions can be seen by considering the following: (1) the location closest to the fiber optic bundle depends on the above inequality and the physical size of the central source and the annulus physical thickness T; and (2) the location furthest from the fiber optic bundle depends upon the diameter of the fiber optic bundle and the actual acceptance cone since the acceptance cone should obviously not be outside the reflector housing if any reasonable efficiency is to be expected. The reason that basal plane 9 in FIG. 2 is not an acceptable source location in accordance with this invention is that $R/R' > \frac{1}{3}$ and it can be seen that if the central source is outside the central cone 12, then annulus 13 will be outside the acceptance cone 4. Contrary to this the position of the annular light source 13 and the central light source 11 or 11A as shown in FIG. 2 meets the requirements of this invention as discussed above. Thus as evident from FIG. 2, the interface of the light sources and the fiber optic bundle(s) require a relative position within a selected range if they are to operate in accordance with this invention.

Figure 3:
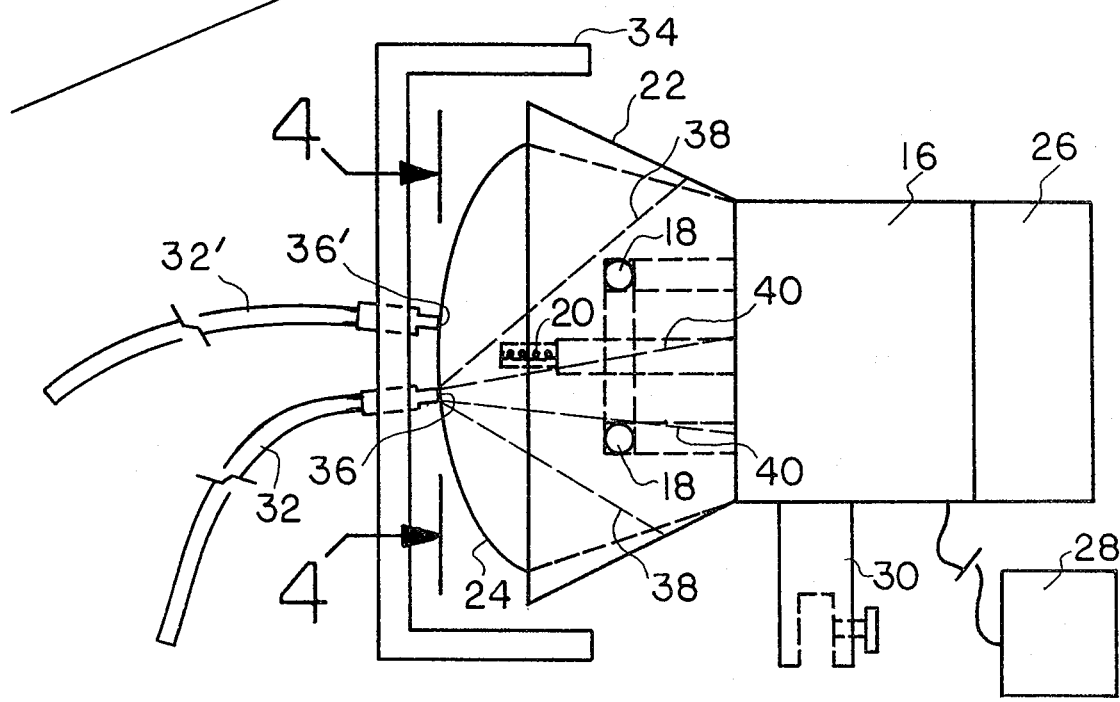
FIG. 3 is a schematic side view of the dual light source and fiber optic bundle illuminator of one embodiment of this invention.
Figure 4:
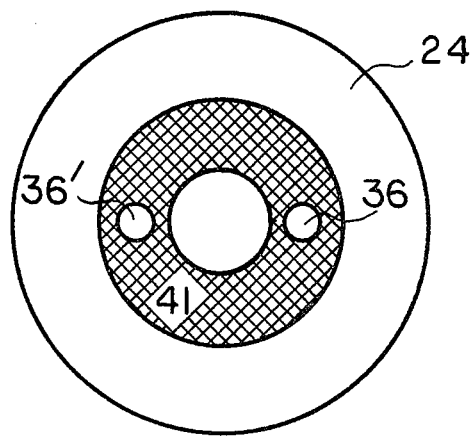
FIG. 4 is a front view taken along line 4—4 illustrating the diffusion dome of the illuminator shown in FIG. 3.

Referring to FIG. 3, a schematic of the illuminator of one embodiment of this invention is shown employing a conventional electronic flash head 16 containing an annular flash tube 18 such as a 2000 watt-second capacity xenon tube. Disposed centrally within tube 18 is a modeling or continuous lamp 20 such as a 150 watt quartz halogen bulb. A wide angle reflector 22, preferably highly polished, is positioned around the light sources to confine the light and, secondarily to maximize the intensity of the light from the sources to a glass diffusion dome 24. The interior of the dome is frosted while its exterior is smooth. Dome 24 is centered in the reflector 22 and a space is provided between the dome 24 and reflector 22 to allow sufficient air flow from a cooling fan 26 coupled to the electronic flash head 16. Generally, the center of the dome 24 will have a relatively small radius of curvature. A conventional power supply 28 is required to provide power to operate the light sources. Preferably a various capacity power supply could be employed. A handle 30 is provided to attach the unit to a suitable support member or the like. Light sources of this type can be obtained from several companies manufacturing professional electronic flash equipped, for example, Norman Enterprises, Inc. Two fiber optic bundles 32 and and 32' of the type commercially available from Dyonics, Inc. is secured in a holder 34 which in turn is disposed over the diffusion dome 24. The proximal end 36 of bundle 32 is placed against dome 24 in a selected area such that modeling light source 20 and flash light source 18 are totally encompassed within the acceptance cone 38 while both the modeling light source 20 and flash light source 18 are not contained within the central cone 40. As evident from FIG. 3, a movement of the fiber optic bundle 32 to the center of the dome 24 or to the periphery of the dome 24 would not fulfill the requirements set forth above. As shown in FIG. 4, the annular area 41 shown cross-hatched on dome 24 is the only area in which the proximal ends 36 and 36' of the specific fiber optic bundles 32 and 32', respectively, could be placed to fulfill the requirement of this invention for transmitting accurate light through the bundles 32 and 32' for illuminating small objects. As evident from FIGS. 3 and 4, a plurality of the same size or different size fiber optic bundles could be placed on the diffusion dome within the general annular area 41 thereby providing multiple fiber optic bundles for illuminating several different objects at the same time or adding additional light to the same area.

As a result of the excellent agreement between the light emitted from the modeling source and the light emitted from the flash source through the same fiber optic bundle in accordance with this invention, the illuminator may be used in applications other than the principal one of providing an illumination source for photography in the close-up-photomacrographic range of magnifications. For example, the novel illuminator could be used as an aid in the assembling of small components or in conjunction with an operation, for example, a surgical device. If the objects to be viewed were in a remote or awkward area, the illumiating fiber optic bundle might be combined with a coherent fiber optic bundle for viewing it. In such an application, the continuous light source would provide illumination for viewing, for example, the alignment of parts, the positioning of a surgical tool or the like, and the flash source would provide a trigger or the like through a photo relay to actuate an operation, for example, start a motor, make a micro weld or the like, or any other process which depended upon observable alignment or positioning. Such a mechanism and procedure might also be useful as a training and/or teaching device for medical or industrial usage and even the same flash source could be used to make a photographic record of the object(s) under observation.

It should be evident that a large and diverse amount of subjects exist within the magnification range of between about 1:3 to about 40:1. These are medical and biological subjects, objects which extend from solid state devices to small mechanical parts and assemblies, and the small organs to be observed and/or operated upon. In addition, numerous other objects such as artifacts, jewelry and the like would be suitable for observing or being photographed using this invention. Thus opportunities exist in the curatorial and laboratory photographic departments as well as in the industrial and commercal studios for this invention.

Crucial to this invention is the recognition and existence of an area defined by a geometrical relationship between the first light source, the second light source and the fiber optic bundle. As evident from FIGS. 1 to 4, the size and location of the area will depend upon the sizes and locations of light sources and the diameter of the particular fiber optic bundles employed.

Figure 5:
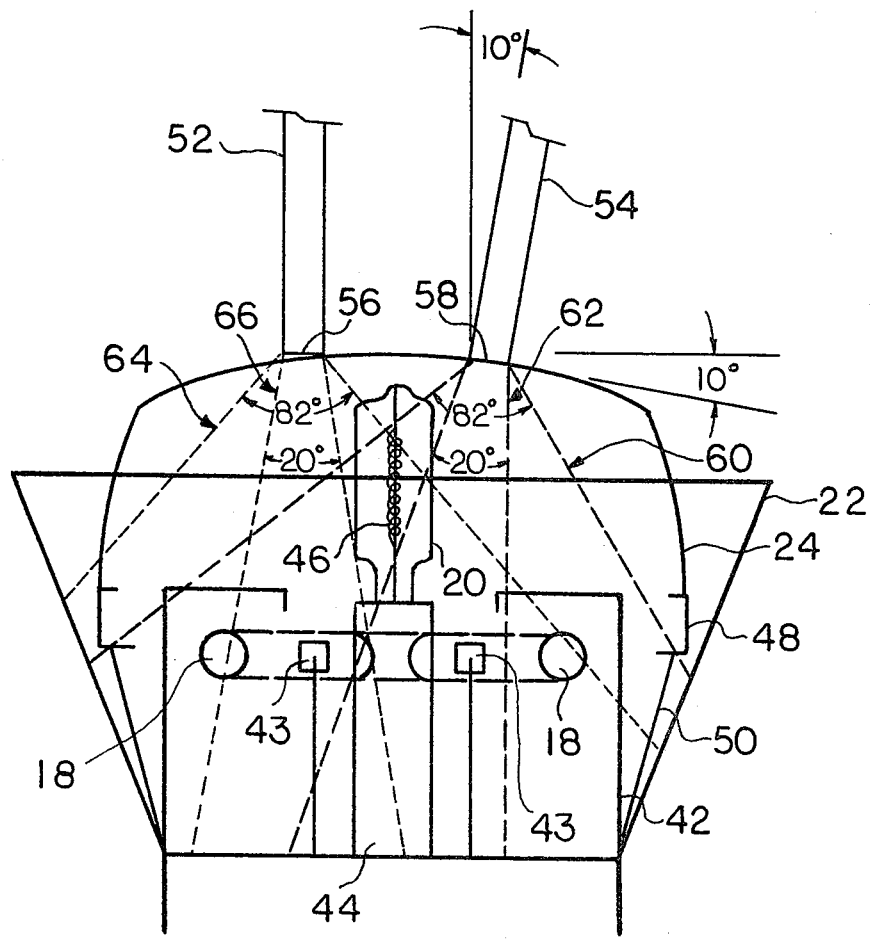
FIG. 5 is a partial sectional schematic view of the dual light source and fiber optic bundle illuminator of FIG. 3 showing two fiber optic bundles disposed on the diffusion dome.

FIG. 5 is a partial schematic view of some of the components shown in FIG. 3 and identified with the same reference numbers. The lamp assembly, diffusion dome and reflector are commercial products obtainable from Norman Enterprises, Inc. Flash tube 18 is ring-shaped except for a segment where the electrodes 40 are connected. The flash tube 18 is protected by an annular glass shield 42. In the center of the flash tube ring 18 and normal to its plane is holder 44 adapted to accept modeling lamp 20 such as a quartz halogen bulb having a thin coiled filament 46. Surrounding flash tube 18 is a highly polished wide angle reflector 22.

The reflector 22 and the flash tube 18 as well as the modeling lamp socket 22 are all attached to a housing not shown. Covering the flash 18 and modeling lamp 20 is a diffusion dome 24 which is joined to a metal ring 48 which in turn is attached with clips 50 to reflector 22. The diffusion dome 24 consists of thin glass which is finely frosted on the surface facing the light sources and smooth on the surface facing away from the light sources.

Two fiber optic bundles 52 and 54 are shown with their proximal tips 56 and 58, respectively, disposed at the diffusion dome 24. Fiber optic bundle 54, having an acceptance cone with an apex angle of 82°, is disposed in touching relation on dome 24 and since the dome 24 is inclined at 10° in the selected area, the fiber optic bundle 54 is also inclined by 10° with respect to the plane of the flash tube 18. As shown in FIG. 5, modeling lamp filament 46 and the flash tube 18 are both encompassed within the conical frustrum segment 60 of the acceptance cone. Concentrically within the acceptance cone is a central cone having an apex angle of 20°. As also shown in FIG. 5, both the modeling lamp filament 46 and the flash tube 18 are not encompassed or contained within the conical frustrum segment 62 of the central cone. Thus the fiber optic bundle 54 would be within the prescribed selected area on the dome to transmit accurate lighting through the bundle 54.

The proximal end 56 of fiber optic bundle 52 is shown normal to the plane of the Flash tube 18 such that it is slightly inclined and not fully touching the dome 24. The acceptance cone of bundle 52 has an apex angle of 82° and the conical frustrum segment 64 defined by the acceptance cone does not totally encompasses both the modeling lamp filament 46 and the flash tube 18. The central cone concentrically disposed within the acceptance cone has an apex angle of 20° and the conical frustrum segment 66 it defines does not encompass the modeling lamp filament 46 but does encompass part of the flash tube 18. Thus fiber optic bundle 52 would not be within the prescribed selected area on the dome to transmit accurate lighting through bundle 52. However, the orientation of bundle 52 on the dome 24 could be slightly moved to within the selected area on the dome so as to transmit accurate lighting through fiber optic bundle 52.

The proximal end 56 of bundle 52 is normal to the plane of flash tube 18 and, consequently, only one edge of the proximal tip 56 touches the diffusion dome 24, which results in a small air space between most of the tip 56 and dome 24. This results in a slight loss in intensity, a slight unevenness in distribution, and a slight loss in accuracy, i.e, in the agreement between the continuous light source and the flash light source in the light emitted from the distal end of the fiber optic bundle.

The specific area on the diffusion dome onto which the fiber optic bundle should be placed in accordance with this invention is dependent upon the following:

(a) the diameter of the fiber optic bundle;

(b) the size of the acceptance cone of the fiber optic bundle;

(c) the relative position of the light sources with respect to each other and to the diffusion dome;

(d) the angle at which the proximal end of the fiber optic bundle is disposed with respect to the light sources.

The primary requirement on the location of the fiber optic bundle is that the two light sources be totally encompassed within the acceptance cone and that the two light sources be located completely outside the central cone. This results in essentially filling the bundle with light while providing for more uniform illumination. As stated above the apex angle of the central cone should be between about 15% to 35% of the apex angle of the acceptance cone and preferably between about 20% and about 25% of the apex angle of the acceptance cone.

Preferably, the flash light source could be an annular xenon filled flash tube while the modeling or continuous linear or point-shaped light source could be a tungsten halogen bulb or small high pulse rate xenon tube. The flash light source could be an annular tube with the modeling light source disposed in the center either above, below or in the plane of the annular tube.

The fiber optic bundle could also have a ring shaped configuration that could coincide with the selected annular area on the diffusion dome. In this embodiment, the intensity of the light obtainable from the apparatus could be maximized for particular applications. There are many variations in the types of fiber optic bundles that can be utilized with this invention.

Some benefits of this invention are:

(a) to provide an economical and modular illuminator for fiber optic bundles which employs both a continuous or modeling light source and an electronic flash source;

(b) to provide a novel illuminator for the purpose of taking photographs in the magnification range of approximately 1:3 to 40:1 of both opaque and translucent objects of various shapes;

(c) to enable the taking of photographs using daylight films with minimal filtration and to enjoy the reduced vibration problem by using flash illumination;

(d) to enjoy the benefits of reduced heat in the subject area by using fiber optics and to enjoy the ability to photograph moving subjects at these magnifications simply by using electronic flash;

(e) to be able to control and anticipate the effect of the electronic flash illumination which requires a highly accurate modeling lamp that is, the illumination emitted by the fiber optic bundle when it is illuminated by the modelling lamp, closely approximates the distribution and quality of the flash illumination emitted by the fiber optic bundle;

(f) to be able to use the fiber optic bundle through a useful range of distances (e.g., ½" to 3") from the subject to be photographed without the use of auxilliary lenses (condensers) on the distal end of the fiber optic bundle and to retain the accuracy of modeling throughout the range of distances;

(g) to have a fairly uniform intensity distribution in the light emitted from the fiber optic bundle, i.e., no small, intense hot spot and no halo of great intensity, and to have this behavior with both the modeling light and the flash source, both throughout the range of working distances;

(h) to have sufficient intensity to enable the photography to be accomplished with one or a small number of flashes throughout the range of magnifications;

(i) to provide an illuminator which can provide the above objectives simultaenously to an unusually large variety of different diameter fiber optic bundles, from 1/16" to ½"; and (j) to provide a means, through fiber optics, to offer the photographer the variety and control of lighting normally used for large object photography in the area of small object photography.

EXAMPLE

A Norman Enterprises LH 2000 flash head containing a 150 watt tungsten halogen modeling light source above and centered in an annular xenon flash tube both of which faced a diffusion dome as shown in FIG. 3 was obtained. A ¼ inch diameter fiber optic bundle having an acceptance cone with an apex angle of 82° and obtained from Dyonics, Inc. was disposed on a selected area on the diffusion dome such that the modeling light source and the flash light source were totally encompassed within the conical frustrum segment of the acceptance cone and the modeling light source and flash light source were both not contained within the conical frustrum segment of the central cone having an apex angle of 20°. This apparatus was used to illuminate 10×10 to the inch grid paper which was then photographed. The resulting photographs revealed a uniform light distribution over the grid area photographed and excellent agreement between the flash only exposure and the modeling lihgt only exposures, i.e. agreement in the size of the areas illuminated and the uniformity of the light within the areas.

The fiber optic bundle was then moved outside of the selected area such that (a) the modeling light source and the flash light source fell within the conical frustrum segment of the central cone, (b) the acceptance cone did not fully encompass both sources; and (c) the fiber optic bundle was placed within the selected area but placed ⅛" away from the dome. The same grid area was photographed and the developed photographs revealed a lack of uniformity in the light distribution (i.e., central hot spots and halos and a lack of agreement between the illumination provided by the flash source and the modeling source, both visually and photographically.) Thus the subject invention is ideally suited for accurately photographing small objects.

It should be understood that the foregoing disclosure relates to preferred embodiments of the invention and it is intended to cover all changes and modifications of the invention which do not depart from the spirit and scope of the appended claims.

I claim:

1. A dual light source apparatus for illuminating small animate or inanimate objects which can be photographed comprising a first light source having a linear or point shape spaced apart from a second light source having an annular or substantially annular configuration with both light sources disposed to illuminate a diffusion dome; at least one fiber optic bundle having a distal end and a proximal end, said at least one fiber optic bundle having an acceptance cone such that light emitted within a conical frustrum segment of the acceptance cone extending from the proximal end of the bundle will be effectively conducted through the at least one fiber optic bundle out through the distal end by substantially total reflection; and wherein the proximal end of the at least one fiber optic bundle is disposed at the diffusion dome and within a specific area of the diffusion dome such that the first light source and the second light source are both totally encompassed with the conical segment of the acceptance cone at the proximal end of the fiber optic bundle and wherein the first light source and the second light source are both not encompassed within a conical frustrum segment of a central cone, at the proximal end of the at least one fiber optic bundle, having an apex angle (central angle) of between about 15% and about 35% of the apex angle of the acceptance cone.

2. The dual light source apparatus of claim 1 wherein the first light source comprises at least two light sources.

3. The dual light source apparatus of claim 1 wherein the central cone has an apex angle of between about 20% and 30% of the apex angle of the acceptance cone.

4. The dual light source apparatus of claim 1 wherein the first light source is a continuous light source and the second light source is an intermittent light source.

5. The dual light source apparatus of claim 4 wherein the intermittent light source is a fixed or variable pulse rate light source.

6. The dual light source apparatus of claim 4 wherein the intermittent light source is an annular tube and wherein the continuous light is disposed substantially along the central axis perpendicular to the plane of the annular tube.

7. The dual light source apparatus of claim 4 wherein the intermittent light source is selected from the group consisting of xenon flash tubes, krypton flash tubes and gas mixtures thereof, and the continuous light source is selected from the group consisting of quartz halogen bulbs and high pulse rate xenon tubes.

8. The dual light source apparatus of claim 1 wherein the diameter of the at least one fiber optic bundle is between about 1/16 inch and about ½ inch.

9. The dual light source apparatus of claim 8 wherein at least two fiber optic bundles are disposed on the specific area of the diffusion dome and wherein the diameter of at least two fiber optic bundles are different.

10. The dual light source apparatus of claim 1 wherein the acceptance cone of the at least one fiber optic bundle has an apex angle between about 67° and about 82°.

11. The dual light source apparatus of claim 10 wherein the acceptance cone of the at least one fiber optic bundle has an apex angle about 82°.

12. The dual light source apparatus of claim 11 wherein the first light source is a continuous light source and the second light source is an intermittent light source.

13. The dual light source apparatus of claim 1, 2, 3, 4, 5 or 6 wherein the first light source and the second light source are disposed in a plane perpendicular to the axis of the fiber optic bundle and in which the radius of the center cone is less than ⅓ the radius of the acceptance cone in said plane.

14. A method for illuminating small animate or inanimate objects with control over highlights and contrast comprising the steps:
(a) positioning a diffusion dome over a dual light source comprising a first light source having a linear or point shape spaced apart from a second light source having an annular or substantially annular configuration;
(b) placing the proximal end of at least one fiber optic bundle at and within a selected area of the diffusion dome such that the first light source and the second light source are encompassed within the conical frustrum segment of the acceptance cone at the proximal end of the at least one fiber optic bundle and such that the first light source and the second light source are both not encompassed within a conical frustrum segment of a central cone, at the proximal end of the at least one fiber optic bundle, having an apex angle of between about 15% and about 35% of the apex angle of the acceptance cone.

15. The method of claim 14 wherein the central cone has an apex angle of between about 20% and about 30% of the apex angle of the acceptance cone.

16. The method of claim 14 wherein the first light source is a continuous light source and the second light source is an intermittent light source.

17. The method of claim 15 wherein the intermittent light source is an annular tube and the continuous light source is disposed substantially along an axis through the center of the annulus and perpendicular to the plane of the annulus.

18. The method of claim 14 wherein the diameter of the at least one fiber optic bundle is between about 1/16 inch and about ½ inch.

19. The method of claim 18 wherein at least two fiber optic bundles are disposed at the area of the diffusion dome and wherein the diamater of the at least two fiber optic bundles are different.

20. The method of claim 14 wherein the acceptance cone of the at least one fiber optic bundle has an apex angle between about 67° and about 82°.

21. The method of claim 19 wherein the acceptance cone of the at least two fiber optic bundle has an apex angle between about 67° and about 82°.

22. The method of claim 21 wherein the first light source is a continuous light source and the second light source is an intermittent light source.

23. The method of claim 14 wherein the first light source and the second light source are disposed in a plane perpendicular to the axis of the fiber optic bundle and in which the radius of the center cone is less than ⅓ the radius of the acceptance cone in said plane.

24. The dual light source apparatus of claim 1 wherein the second light source comprises at least two light sources.

* * * * *